United States Patent [19]

Junier

[11] Patent Number: 4,827,967
[45] Date of Patent: May 9, 1989

[54] PLUG VALVE

[75] Inventor: Marius R. Junier, Houston, Tex.

[73] Assignee: Triten Corporation, Houston, Tex.

[21] Appl. No.: 87,091

[22] Filed: Aug. 19, 1987

[51] Int. Cl.⁴ .......................... B08B 9/02; B65G 53/40
[52] U.S. Cl. ...................................... 137/240; 222/148;
251/214; 277/106; 406/132
[58] Field of Search ................ 137/238, 240; 222/148;
251/214; 277/106; 406/128, 132, 133; 134/166
C, 167 C, 168 C, 169 C

[56] References Cited

U.S. PATENT DOCUMENTS

| 601,614 | 3/1898 | Dudley | 277/106 |
|---|---|---|---|
| 758,118 | 4/1904 | Sticker . | |
| 843,230 | 2/1907 | McCarthy | 277/106 |
| 998,111 | 7/1911 | Murray . | |
| 1,319,193 | 10/1919 | Von Porat . | |
| 1,364,532 | 1/1921 | Von Porat . | |
| 1,566,517 | 12/1925 | Bergman . | |
| 2,378,607 | 6/1945 | Watts | 137/240 |
| 2,433,726 | 12/1947 | Angell . | |
| 2,628,158 | 2/1953 | Wilcox et al. | 137/240 |
| 2,630,352 | 3/1953 | Degnen et al. | 406/132 |
| 2,664,338 | 12/1953 | Cornell . | |
| 2,668,755 | 2/1954 | Kershaw et al. . | |
| 2,682,277 | 6/1954 | Marshall et al. | 137/240 |
| 2,850,364 | 9/1958 | Dowling . | |
| 2,901,331 | 8/1959 | Held et al. . | |
| 3,315,700 | 4/1967 | Greenwood . | |
| 3,339,577 | 9/1967 | Teegarden . | |
| 3,787,060 | 1/1974 | Astill et al. | 277/106 |
| 3,846,080 | 11/1974 | MacLean et al. . | |
| 3,968,970 | 7/1976 | Vogeli | 277/106 |
| 4,345,766 | 8/1982 | Turanyi | 277/106 |
| 4,518,146 | 5/1985 | Stinson et al. . | |
| 4,552,490 | 11/1985 | Neale | 137/240 |
| 4,623,119 | 11/1986 | van der Wiel . | |

FOREIGN PATENT DOCUMENTS 2066906 7/1981 United Kingdom ................ 277/106

OTHER PUBLICATIONS

"Fluid Catalytic Cracking Ultra-Orthoflow", Hydrocarbon Processing, Sep. 1984, p. 108.
"Heavy Oil Cracking (HOC)" Id., p. 109.

Primary Examiner—George L. Walton

[57] ABSTRACT

A plug valve and a sealing assembly for a plug valve. A plug valve having a plug closure member for sealing off the open end of a conduit and thereby preventing flow of a first fluid through the conduit, the plug closure member connected to a hollow stem tube, a channel for the flow of a second fluid, (a lift medium), extending through the hollow stem tube and plug closure member, the plug closure member and stem movable in a guide tube toward and away from the open end of the conduit, the plug closure member seatable in the open end of the conduit, and a sealing assembly disposed between the stem tube and guide tube for preventing the flow of fluid, fluidized catalysts, or purge medium downward past the sealing assembly and for preventing the flow of lift medium or feedstock upward past the sealing assembly. A spacer for a purge channel is provided for even distribution of a purge medium.

4 Claims, 5 Drawing Sheets

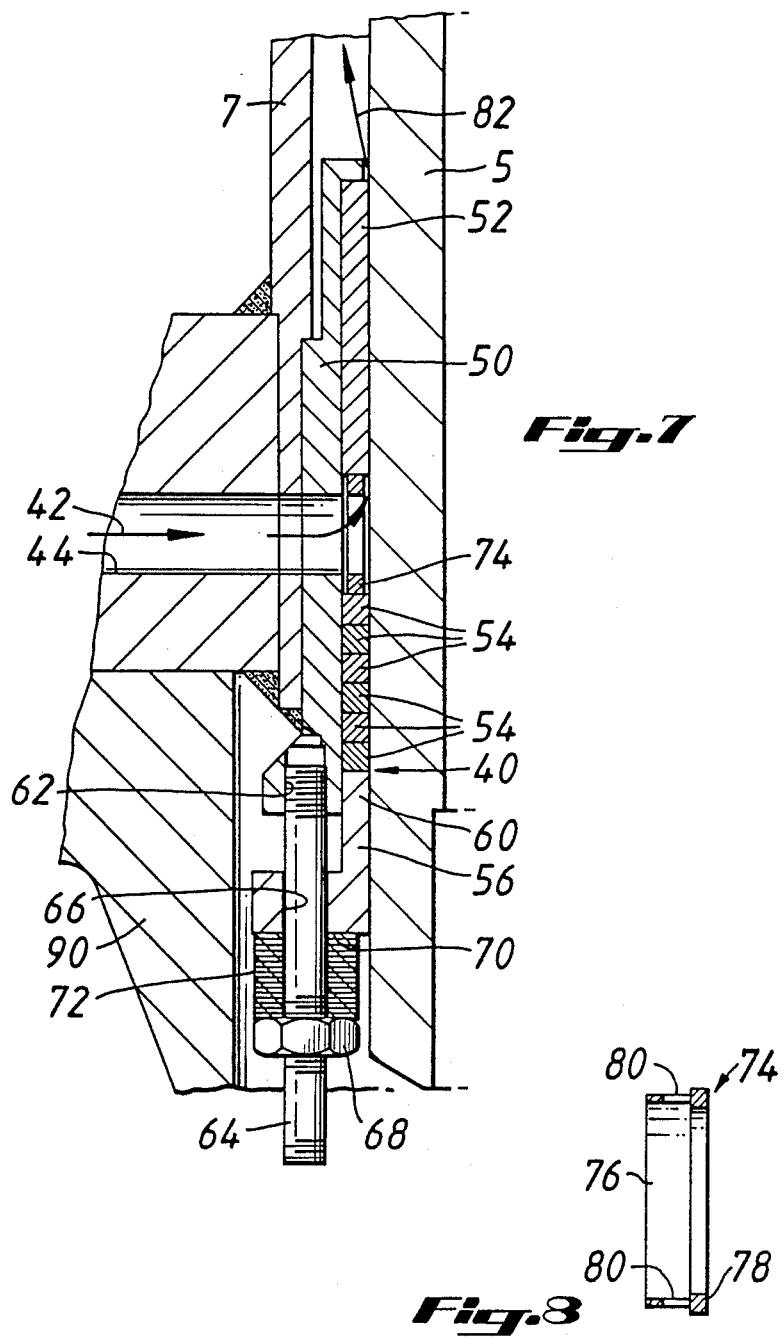

PLUG VALVE

BACKGROUND OF THE INVENTION

1. Field of the Invention

This invention relates to a control valve, and particularly to a plug type control valve for controlling the flow of fluids or fluidized materials through a conduit, such as the powered catalyst transfer lines and flue gas vent stacks employed in fluid catalytic cracking systems and in fluid catalytic hydroforming systems in the petroleum refining art; and to a sealing assembly for providing a seal between the stem tube and guide tube of a plug valve; and to a plug valve with such a sealing assembly.

2. Description of the Prior Art

In the chemical and petroleum industries fluid catalytic methods are employed in which finely divided catalyst particles are maintained suspended in a gas in the so-called "fluid state" under reaction conditions. Particles in the fluid state act in many ways like a liquid and undergo hindered settling. Thus, they may be conveyed from one vessel to another through a conduit, they develop a pressure head, etc.

Large units can operate continuously on-stream for extended periods of time under closely controlled conditions by employing fluid catalytic procedures. Catalysts in such units in processes where deposition of undesirable coke or other contaminant is encountered during the reaction state may be maintained at a predetermined level by continuously circulating the catalyst from the fluid reactor to a regenerator, where such coke or contaminant is removed, as by oxidative combustion. Fluid units of large capacity, such as a through-put of sixty thousand barrels or more of charge per day, are intended to operate on-stream for periods of as long as a year or more without being shut down.

Various applications involve high temperature operations in the chemical processing and petroleum refining arts, including use in a converter, such as a fluid catalytic cracking unit or a fluid catalytic hydroforming unit of conventional design, having superimposed contact chambers in which the catalyst is maintained in a state of phase separation comprising an upper diffuse phase and a lower dense pseudo-liquid phase, the catalyst being withdrawn from the lower dense phase of the upper chamber through a vertical internal standpipe and discharged at a low point within the dense phase of the lower chamber and, after suitable treatment in the lower chamber, being returned upwardly through an internal vertical carrier line to the dense phase of the upper chamber.

By passing catalyst by gravity flow from the upper chamber to the lower chamber through a standpipe and passing the catalyst from the lower chamber to the upper chamber through a carrier line by injection thereinto a stream of the gas to be contacted in the upper chamber, a continuous flow of the mixture upwardly through the carrier line is produced. In those cases where a regeneration zone is superimposed upon a conversion zone, the gas introduced into the carrier line is ordinarily air or other oxygen-containing gas. In those cases where the conversion zone is superimposed upon the regeneration zone the gas introduced into the carrier line is a stream of vaporous hydrocarbons.

Flow control of catalyst from the standpipe into the dense phase of the lower chamber and from the latter into the carrier line for conveyance into the upper chamber is obtained by the use of plug valves engageable with the lower ends of the transfer lines and having elongated valve stems extending through the vessel wall controlled in their longitudinal movement by external mechanical or manual operating means. These plug valves are used in oil refineries in controlling the flow of catalyst into a reaction chamber which is subject to temperature extremes, for example, in the range of 1500° F., as well as in other industrial applications wherein the valves are subject to oppositely directed displacements due to thermal expansion and spring forces.

Plug valves (such as Kellogg Orthoflow Valve, U.S. Pat. No. 2,850,364) are used to control the flow of catalyst to introduce a lift medium such as oil feed stock or lift air into a riser line. One problem occurring with the hollow tube plug valve providing a lift medium through the center hollow section is that the lift medium pressure at the inlet of the valve cannot be maintained at a high enough level to overcome the bottom regenerator pressure. If the regenerator pressure is greater than the lift air pressure, catalyst from the regenerator can block the valve's guide liners and cause the valve to stick. Another problem with prior art valves occurs when the pressure of the lift medium is greater than the regenerator pressure, permitting the lift medium to go between the valve's guide liners causing the valve to stick.

There has been a long-felt need to overcome the problems associated with the prior art plug valves. The present invention addresses and satisfies this long-felt need.

Applicant believes U.S. Pat. Nos. 2,668,755 and 4,518,146 and the two publications from Hydrocarban Processing are pertinent to the present invention, but fail to teach either alone or in combination the unique, novel and unobvious combinations and apparatuses of the present invention.

SUMMARY OF THE INVENTION

The present invention is directed to a novel and efficient plug valve and to a unique sealing assembly for a plug valve. The present invention recognizes and solves the problems of: differentials in regenerator pressure and lift medium pressure; the unwanted sticking of the valves; and the need for excessive amounts of a purge medium.

A plug valve according to the present invention functions to provide an opening of desired size at the open end of a conduit to permit a first fluid (e.g. a catalyst stream) to enter the conduit or it functions to close off the conduit opening. The plug valve has a plug closure member connected to a hollow stem tube. The plug closure member is movable (with the stem tube) to affect the size of the conduit's opening or to seat therein closing it off. A second fluid, a lift medium such as oil fuel stock or lift air, flows out through a channel which passes through the hollow stem tube and through the plug closure member. This second fluid is under pressure so that it will assist the flow of the first fluid into the open end of the conduit.

A portion of the plug valve's stem tube is movably disposed in a guide tube which guides the stem tube during its movement. Between the stem tube an the guide a plurality of guide liners made preferably from steel can be positioned to guide the stem tube and provide a pathway for a purge medium. A purge assembly can be employed to provide a purge medium such as air or steam to purge the space between the stem tube and guide tube of unwanted catalyst. A regenerator contains the catalyst under pressure. The regenerator pressure can force fluidized catalyst into the space between the stem tube and guide tube.

Although in prior art valves the lift medium, regenerator medium, and purge medium can flow into the space between the guide tube and stem tube; in a valve according to the present invention a sealing assembly can be provided which seals off the space between the two tubes to inhibit the flow of the regenerator medium and the lift medium. Compressible packing can be used in the sealing assembly. The assembly is mounted internally within the valve. In one embodiment, energized springs or washers can be employed with bolts urging a member against the packing so that, if the packing compresses during use, the springs or washers will urge the member against the packing to maintain an effective seal.

The present invention also provides a new spacer for distributing a purge medium in a plug valve and a plug valve using such a spacer.

It is therefore an object of the present invention to provide a novel and efficient plug valve and sealing assembly for a plug valve.

Another object of the present invention is the provision of a sealing assembly to seal off the space between a stem tube and a guide tube in a plug valve.

Another object of the present invention is the provision of a plug valve with such a sealing assembly.

Another object of the present invention is the provision of a plug valve with an internal sealing assembly between the valve's stem tube and guide tube.

Another object of the present invention is the provision of a sealing assembly for sealing off the space between a stem tube and a guide tube of a plug valve in which the sealing assembly contains compressible packing. Another object is the provision of a plug valve with such a sealing assembly.

Another object of the present invention is the provision of such a sealing assembly in which an energized member such as a spring or spring washer (or a plurality thereof) are used to push a member, flange, or plate against the compressible packing material so that as the material compresses during use the seal is effectively maintained. Another object of the present invention is the provision of a plug valve with such a sealing assembly.

Another object of the present invention is the provision of a plug valve having a positive seal between its regenerator medium and its lift medium.

Another object of the present invention is the provision of a plug valve in which the required amount of purge medium is significantly reduced.

Another object of the present invention is the provision of a spacer for distributing evenly a purge medium between the stem tube and guide tube of a plug valve; and a valve having such a spacer.

To one of skill in this art who has the benefits of this invention's teachings, other and further objects and advantages will be clear from the following description of presently preferred embodiments, given for the purpose of disclosure when taken in conjunction with the accompanying drawings.

BRIEF DESCRIPTION OF THE DRAWINGS

FIG. 7 is a partial view of the apparatus of FIG. 3.

FIG. 8 is a cross-sectional view of a spacer ring according to the present invention.

DESCRIPTION OF PREFERRED EMBODIMENTS

Figure 1:
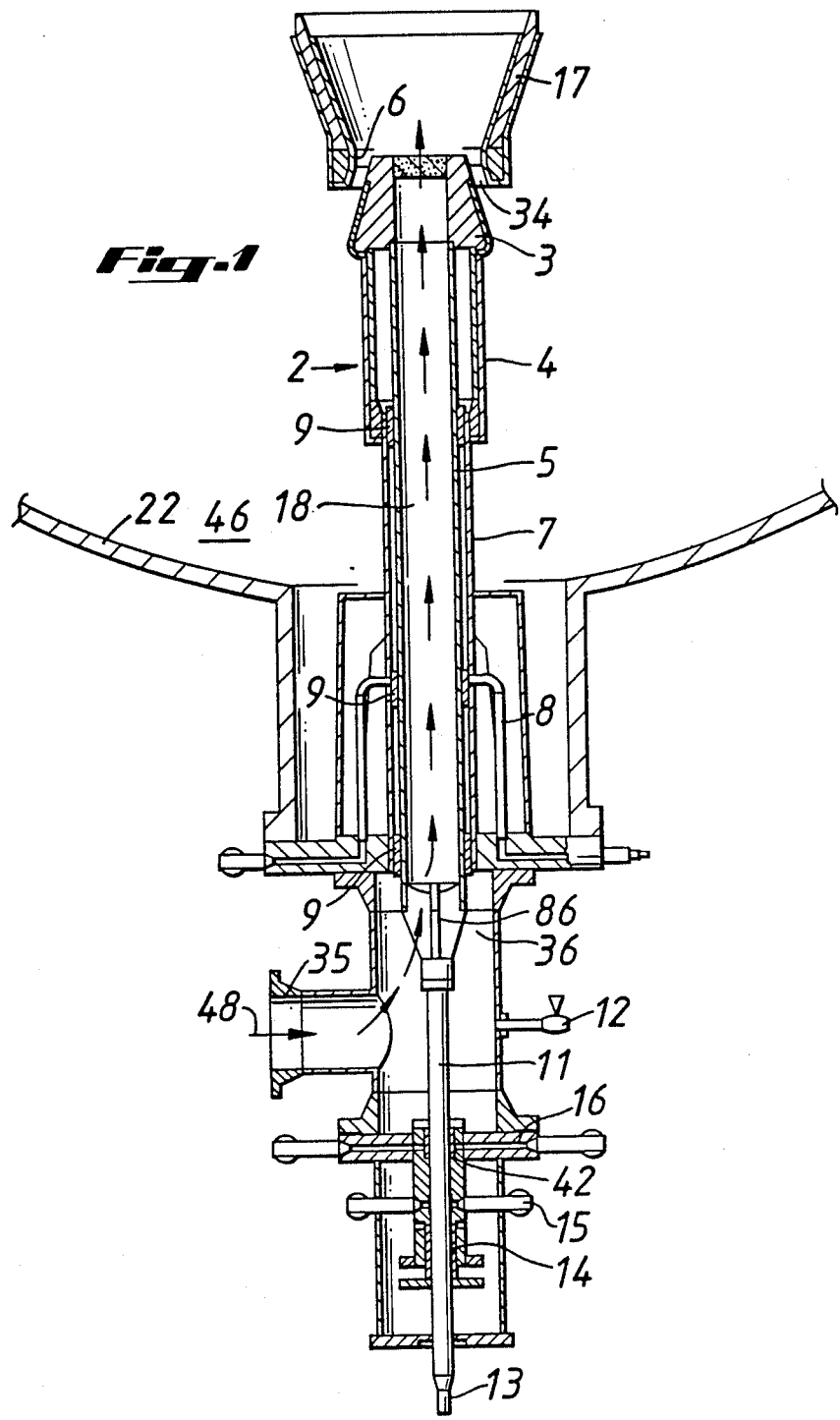
FIG. 1 is a side view in cross-section of a prior art plug valve.
Figure 6:
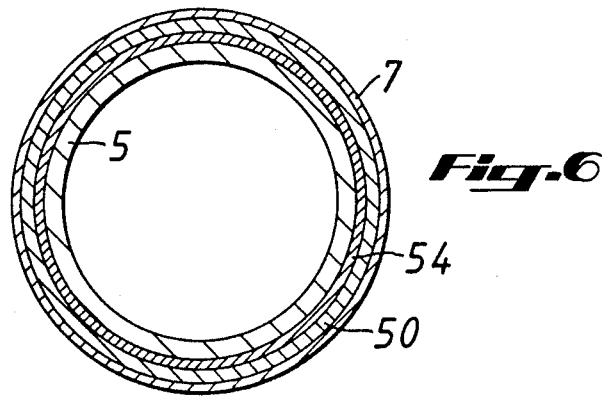
FIG. 6 is a cross-sectional view of the sealing assembly of the valve of FIG. 2 taken along line C—C of FIG. 2.

Referring now to FIG. 1, a prior art plug valve 2 has a guide tube 7 within which is movably disposed a hollow stem tube 5. A plug closure member 3 is secured to one end of the stem tube 5. A channel 18 extends through the stem tube 5 and the plug closure member 3. An actuator (not shown) is connected to an end 13 of the stem tube 5. The actuator can move the stem tube 5. The actuator can move the stem tube 5 up and down within the guide tube 7 so that the plug closure member 3 is movable to affect the size of an opening 34 (see FIGS. 6,7) in a conduit 17 or so that the plug closure member 3 is seated on a seat 6 of the conduit 17 to prevent flow through the conduit 17.

Guide liner bearings 9 facilitate the movement of the stem tube 5 in the guide tube 7. A shroud 4 secured to the plug closure member 3 protects the stem tube 5 from wear due to catalyst flow.

A purge system 8 is provided which is in communication with the space between the guide tube 7 and the stem tube 5 for purging any unwanted fluid or material which moves into the space. A fluid (such as air) is flowed through the inlet 35 connected to the chamber 36 which is in communication with the channel 18. A fluid pumping source (not shown) pumps the fluid to the inlet 35 at a desired pressure. A pressure indicator 12 is connected to the chamber 36 for providing pressure reading for the fluid in the chamber 36. The end 13 of the stem tube 5 is connected to the shaft 11 which is in turn connected to the stem tube 5. The arrows in FIG. 1 show the path of air flow through the channel 18 and out of the plug closure member 3.

A lower stem purge system 16 provides purging for bearings 42 which encompass the shaft 11. A packing 14 is provided for the shaft 11 and a sealant injection device 15 provides the passage to inject a sealing medium for the purpose of renewing the packing while the plug valve is in service. A regenerator 22 is disposed about the plug valve and serves to contain fluidized catalyst. The plug valve controls the level of catalyst in the regenerator. From the regenerator the fluidized catalyst goes to an upper vessel (not shown) throught the conduit 17.

As shown in FIG. 1, the plug closure member 3 is not seated in the seat 6 of the conduit 17. Fluid flow, such as a flow of catalyst particles, is permitted through the opening 34 of the conduit 17. The force of the air coming up through the channel 18 impels the catalyst particles into the conduit 17. When it is desired to cut off the flow of fluid through the opening 34, the activator (not shown) is activated to move the shaft 11, stem tube 5, and plug closure member 3 upwardly so that the plug closure member 3 seats against the seat 6 of the conduit 17.

Figure 2:
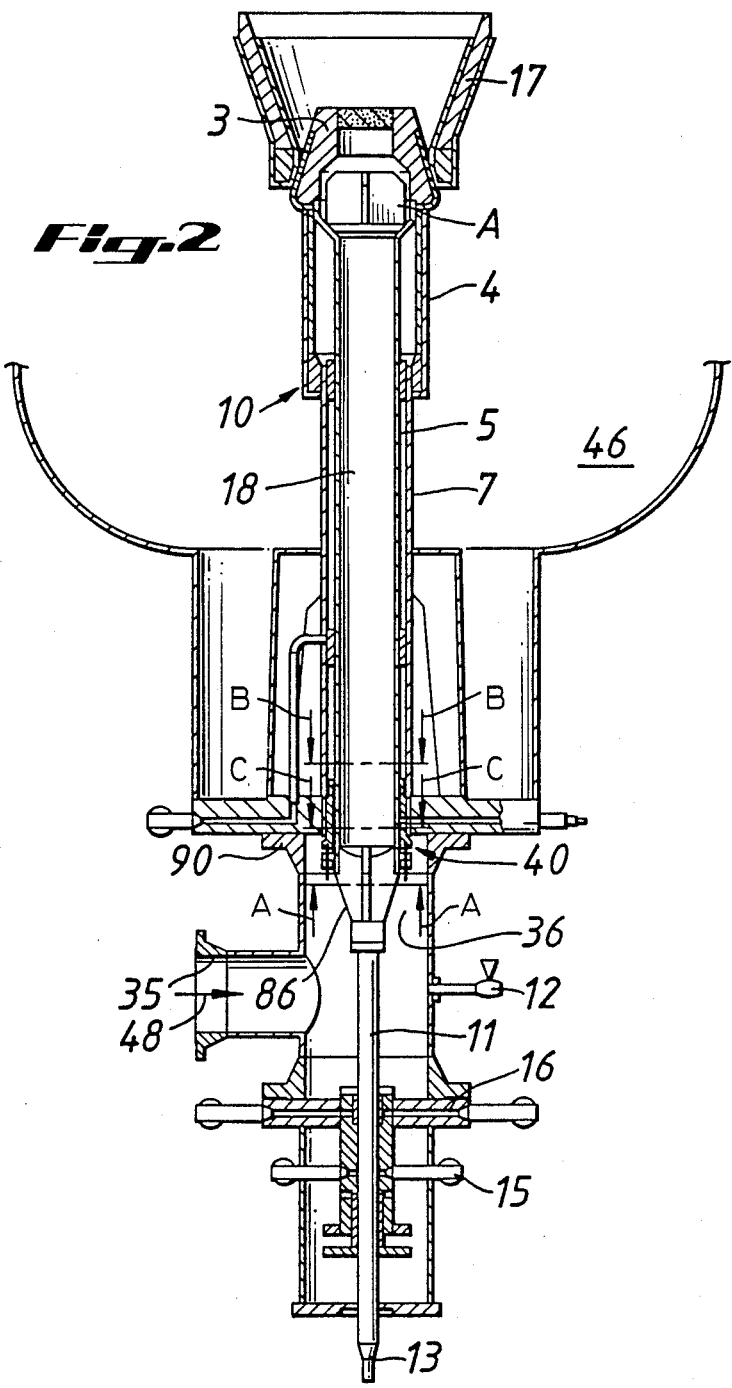
FIG. 2 is a side view in cross-section of a plug valve according to the present invention.

Referring now to FIG. 2 the plug valve 10 according to the present invention has various parts similar to those of prior art valves. Numerals common to FIGS. 1 and 2 indicate similar parts. The plug valve disclosed in FIG. 2 has a check valve A disposed in the upper portion of the valve. This is not part of the present invention and is disclosed and claimed n co-pending application Ser. No. 025,328 filed Mar. 13, 1987 which is commonly owned by the assignee of the present application.

The sealing assembly 40 shown in FIGS. 2, 3, 6, and 7 provides a seal between the stem tube 5 and the guide tube 7. Without this seal assembly 40 a variety of fluids and mediums could flow between the stem tube 5 and the guide tube 7 with deleterious effects. The seal assembly 40 inhibits or prevents the flow past the seal assembly 40 of a purge medium such as purge air 42 which is introduced throught a purge inlet 44 for purpose of purging the area between the stem tube 5 and the guide tube 7, particularly for purging catalyst from this area. The seal assembly 40 inhibits or prevents the flow past the seal assembly 40 of a regenerator medium such as flowing fluidized catalyst which may flow from the regenerator 46 into the space between the stem tube 5 and the guide tube 7. The seal assembly 40 inhibits or prevents the flow past the seal assembly 40 of a lift medium such as lift air or feedstock 48.

The seal assembly 40 for sealing the space between the stem tube 5 and the guide tube 7 in the plug valve 10 a retainer member 50 which holds in place a guide liner 52 between the stem tube 5 and the guide tube 7. Compressible sealing packing material 54 is disposed between the retainer member 50 and the stem tube 5 (see FIG. 6). A gland member 56 is movably disposed between the stem tube 5 and the mounting flange 90. A portion 50 of the gland member 56 is in contact with the packing 54. The retainer member 50 has a threaded recess 62 therein for receiving the end of a bolt 64. The gland member 56 has an opening 66 therethrough for receiving the bolt 64. The gland member 56 is movable about the bolt 64. A threaded nut 68 is emplaced about the bolt 66. Between a surface 70 of the gland member 56 and the nut 68 are disposed one or preferably a plurality of compressed spring washers 72 which are urged against the gland member 56. The bolt 64 assists in holding the gland member 56 in place and provides for adjustment of the position of the gland member 56.

Figure 3:
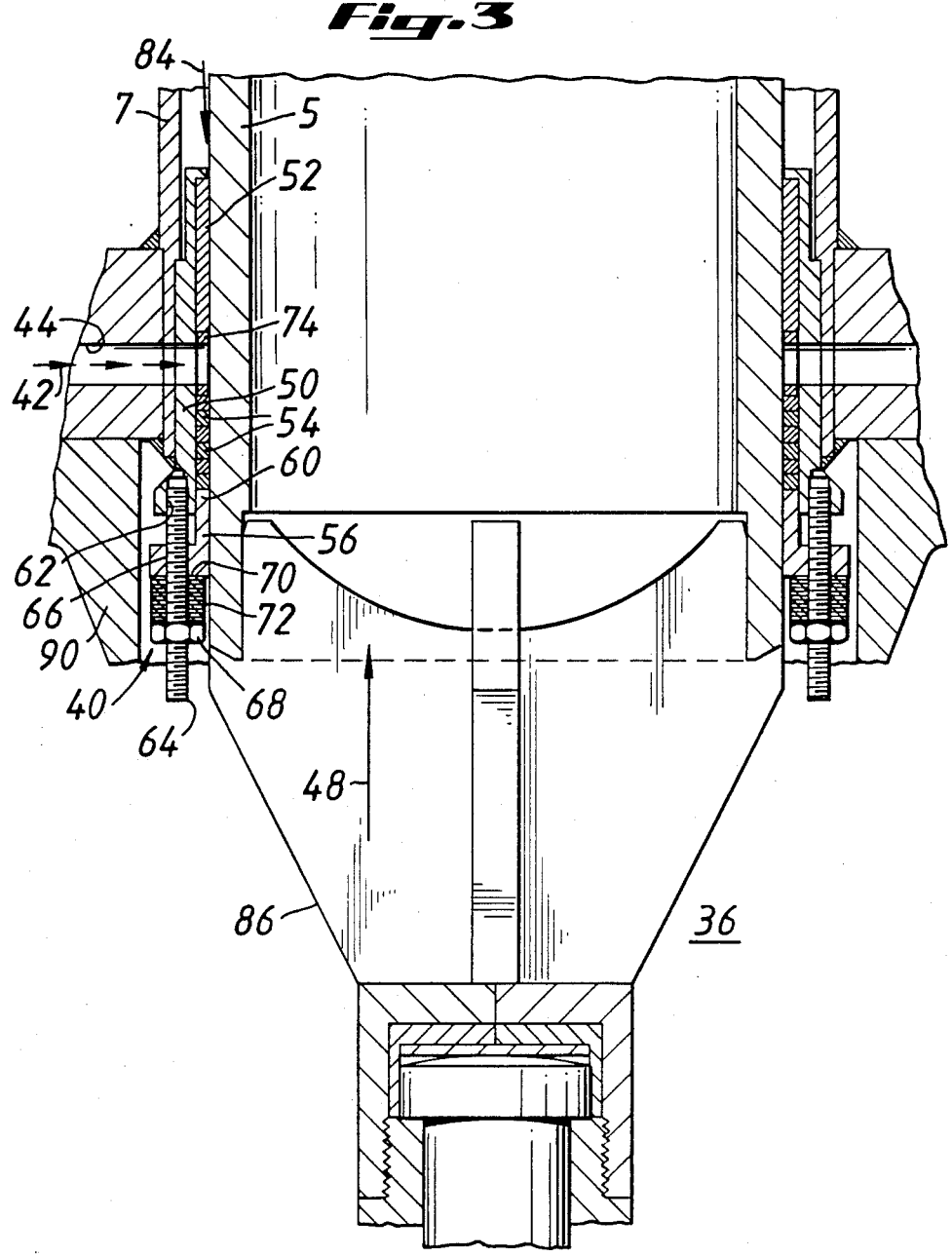
FIG. 3 is a side view in cross-section of a portion of the plug valve of FIG. 2 including a sealing assembly.

In the embodiment of FIG. 3 a spacer 74 is employed at an end of the purge inlet 44. It is preferred that this spacer 74 be formed as shown in FIG. 8 with a central cylinder member 76 and connected integrally thereto an end ring 78 with one or preferablity a plurality of holes 80 through the member 76 so that the purge medium (e.g. purge air) is evenly distributed to accomplish as complete a purge as possible of the cavity between the stem tube 5 and the guide tube 7. As shown by the arrow 82 in FIG. 7, purge air moves between the stem tube 5 and the guide tube 7 to purge the space between the two of unwanted material such as fluidized catalyst. As shown by the arrow 84 in FIG. 3, unwanted fluidized catalyst could flow into the space between the two tubes.

If the packing 54 becomes worn or compressed during use, the spring washers 72 pushing against the nut 68 will push the gland member 56 toward the compressed packing so that a good seal is maintained . Upon initial adjustment the nut 68 can be permanently welded to the bolt 64.

Figure 4:
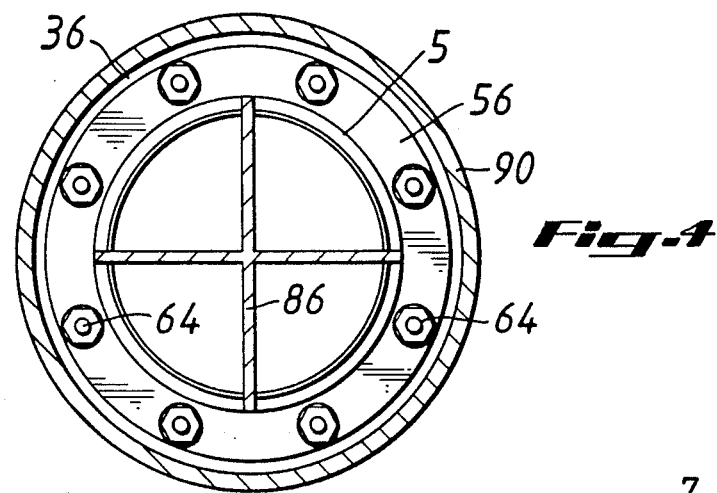
FIG. 4 is a bottom cross-sectional view of a portion of the valve of FIG. 2 taken along line A—A of FIG. 2.
Figure 5:
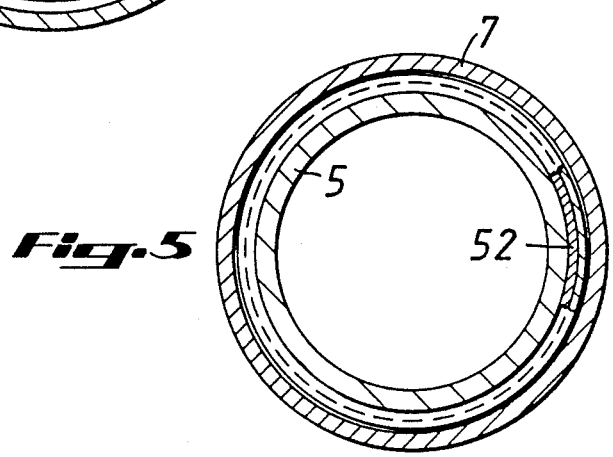
FIG. 5 is a top cross-sectional view of a portion of the valve assembly of FIG. 2 taken along line B—B of FIG. 2.

FIG. 4. illustrates a view of a portion of the plug valve 10 from the bottom, showing the gland member 56 held in place by a plurality of bolts 64. FIG. 5 illustrates a view from the top looking down at a cross-section of the plug valve 10 throught the line B—B of FIG. 2 showing the stem tube 5, the guide tube 7 and the guide liner 52.

In conclusion, therefore, it is seen that the present invention and the embodiments disclosed herein are well adapted to carry out the objectives and obtain the ends set forth at the outset as well as others inherent therein. Certain changes can be made in the method and apparatus without departing from the spirit and the scope of this invention. While there have been described various embodiments of the present invention, the methods and apparatus described are not intended to be understood as limiting the scope of the invention. It is realized that changes therein are possible and it is further intended that each element recited in any of the following claims and each combination of elements is to be understood as referring to all equivalent elements or equivalent combinations for accomplishing substantially the same results in substantially the same or equivalent manner. It is intended that the claims cover the invention broadly in whatever form its principles may be utilized. To those of skill in this art who have the benefit of this invention's teachings it will be clear that certain changes and modifications can be made in the disclosed preferred embodiments without departing from the spirit of the invention as defined in the following claims.

What is claimed is:

1. A plug valve for controlling fluid flow of a first fluid from a chamber into an open end of a conduit, and for effecting closure between the chamber and the open conduit end, the plug valve comprising a plug closure member seatable in the open end of the conduit and movable toward and away from the open end of the conduit, a stem tube connected to the plug closure member, channel means extending through the plug closure member and through the stem tube for the passage of a lift medium therethrough from inlet means, a guide tube for guiding the stem tube, a portion of the stem tube movably disposed within the guide tube and spaced apart therefrom, and a seal assembly disposed within a space defined within said inlet means and positioned between the stem tube and the guide tube for sealing the space between the stem tube and the guide tube to inhibit or prevent the flow of the lift medium from flowing into the space between the stem tube and the guide tube as it flows through the channel means to an outlet means, the seal assembly includes a compressible packing material for sealing the space between the stem tube and guide tube and urging means disposed within said inlet means abutting the compressible packing material for pushing against the material to effectively maintain the sealing of the space between the stem tube and the guide tube.

2. The plug valve of claim 1 wherein the chamber is a regenerator for containing a regenerator medium, the regenerator in communication with the space between the stem tube and the guide tube, purge means for purging with a purge medium the space between the stem tube and the guide tube, lift medium transmission means for conducting the lift medium to the channel means extending through the plug closure member, the lift medium transmission means having a flow path therethrough for the lift medium, the flow path communicating with the space between the stem tube and the guide tube, and the seal assembly sealing the space between the stem tube and the guide tube to inhibit or prevent the flow of the purge medium, the regenerator medium, and the lift medium into the space between the stem tube and the guide tube.

3. The plug valve of claim 2 wherein the regenerator medium is fluidized catalyst.

4. A plug valve for controlling fluid flow of a first fluid from a chamber into an open end of a conduit, and for effecting closure between the chamber and the open conduit end, the plug valve comprising a plug closure member seatable in the open end of the conduit and movable toward and away from the open end of the conduit, a stem tube connected to the plug closure member, channel means extending through the plug closure member and through the stem tube for the passage of a lift medium therethrough from an inlet means, a guide tube for guiding the stem tube, a portion of the stem tube movably disposed within the guide tube and spaced apart therefrom, and a seal assembly disposed within a space defined within said inlet means and positioned between the stem tube and the guide tube for sealing the space between the stem tube and the guide tube to inhibit or prevent the flow of the lift medium from flowing into the space between the stem tube and the guide tube as it flows through the channel means to an outlet means, the seal assembly including a compressible packing material for sealing the space between the stem tube and the guide tube and urging means disposed adjacent the compressible packing material for pushing against the material to effectively maintain the sealing of the space between the stem tube and the guide tube;

the chamber being a regenerator for containing a fluidized catalyst, the regenerator in communication with the space between the stem tube and the guide tube, purge means for purging with a purge medium the space between the stem tube and the guide tube, lift medium transmission means for conducting the lift medium to the channel means extending through the plug closure member, the lift medium transmission means having a flow path therethrough for the lift medium, the flow path communicating with the space between the stem tube and the guide tube, and the seal assembly sealing the space between the stem tube and the guide tube to inhibit or prevent the flow of the purge medium, the regenerator medium, and the lift medium into the space between the stem tube and the guide tube.

* * * * *